United States Patent [19]

Mason

[11] 4,081,118
[45] Mar. 28, 1978

[54] CARRIER FOR USE IN SUPPORTING A CANOE OR OTHER ELONGATE ARTICLE ON A VEHICLE ROOF

[76] Inventor: Robert Alan Mason, 11 Forest Ave., Essington, near Wolverhampton, England, WV11 2AJ

[21] Appl. No.: 679,655

[22] Filed: Apr. 23, 1976

[30] Foreign Application Priority Data
Apr. 23, 1975  United Kingdom ............... 16723/75

[51] Int. Cl.² .............................................. B60R 9/04
[52] U.S. Cl. .......................... 224/42.1 G; 211/60 R; 224/42.1 R; 248/226.3; 248/316 C
[58] Field of Search .......... 224/29 R, 42.1 R, 42.1 B, 224/42.1 E, 41.1 F, 41.1 G, 42.42 R, 42.45 R; 296/3; 24/731 A/81 G, 263 A, 263 LS, 263 C, 135 K; 211/49 R, 60 R; 248/225.3, 226.3, 230, 316 C

[56] References Cited

U.S. PATENT DOCUMENTS

| 554,091 | 2/1896 | Sears | 24/73 LA X |
| 2,061,937 | 11/1936 | Fay | 224/29 R X |
| 2,208,860 | 7/1940 | Smart | 24/263 LS X |
| 2,712,167 | 7/1955 | Blanchard | 24/263 C X |
| 2,907,506 | 10/1959 | Sammons | 224/42.1 G |

FOREIGN PATENT DOCUMENTS

| 242,998 | 3/1960 | Australia | 224/42.1 E |
| 258,741 | 12/1967 | Australia | 224/42.1 G |
| 1,316,498 | 9/1961 | France | 24/81 G |

*Primary Examiner* — Robert J. Spar
*Assistant Examiner* — Winston H. Douglas
*Attorney, Agent, or Firm* — Scrivener, Parker, Scrivener and Clarke

[57] ABSTRACT

A carrier for use in supporting, for example, a canoe on a vehicle roof has a base which is adapted for clamping the carrier onto a roof rack which is to be mounted on the vehicle, and a pair of laterally spaced limbs which extend upwardly from the base and define a cradle for supporting the canoe. The limbs are preferably laterally adjustable for altering the width of the cradle. Usually a pair of the carriers will be mounted on the roof rack for supporting the canoe at spaced positions along its length.

6 Claims, 4 Drawing Figures

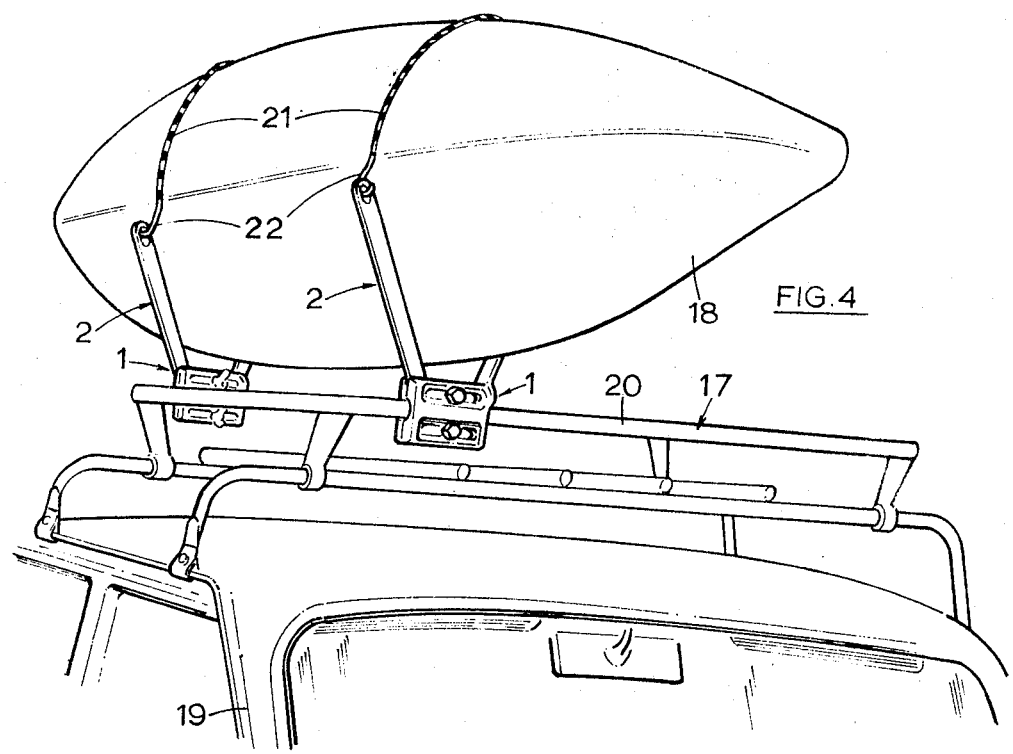
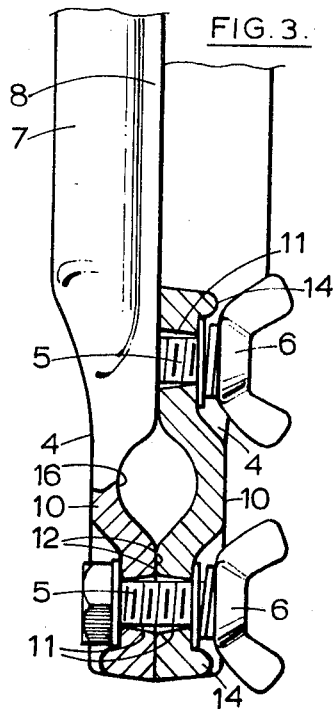

CARRIER FOR USE IN SUPPORTING A CANOE OR OTHER ELONGATE ARTICLE ON A VEHICLE ROOF

This invention relates to a carrier for use in supporting a canoe or other elongate article on a vehicle roof.

The present invention consists in a carrier for use in supporting a canoe or other elongate article on a vehicle roof, comprising a base including clamping means adapted for releasably mounting the carrier on a vehicle roof rack, and a pair of limbs which extend upwardly from the base in laterally spaced relationship and define a cradle for supporting a canoe or other article.

Usually at least two of the carriers would be used for supporting the article at spaced positions along its length, the carriers being mounted at aligned spaced positions on the supporting roof rack.

The carrier will normally be mounted on a cross member of a roof rack for use. The rack may be of the type for carrying luggage, or of the type, used for example for carrying ladders, which may have only one cross member. Generally the frame members of racks are made of metal tube and therefore the base is conveniently appropriately constructed for attachment to such members.

The limbs of the carrier may include anchorages for a retainer, such as an elasticated strainer or band, which extends over the canoe or other article supported in the cradle to retain the article securely in the cradle. The anchorages may be holes in the limbs, hooks, notches or be of any other suitable form.

Preferably the limbs are laterally adjustable to enable the width of the cradle to be altered to suit articles to be supported of different sizes, or to suit, for example, in the case of canoes the different widths of the canoes at different parts of their lengths. This may be done by arranging for the limbs to be adjustable on the base, or the base may comprise two relatively movable members each of which carries one of the limbs and which can be secured in various positions relative to one another at which the limbs are spaced apart by different distances. In the latter arrangement the carrier may comprise two similar unitary components each of which provides one of the limbs and one of the members of the base. The base members of the two components may be shaped to form two halves of a clamp which are adjustably secured together. It will be appreciated that the manufacture and cost of the carrier can be respectively simplified and reduced by constructing it from two similar components.

An embodiment of the invention will now be described by way of example with reference to the accompanying drawings in which:

FIG. 3 is an enlarged detail view of the lower part of the carrier partly sectioned on the line 3 — 3 of FIG. 1, and FIG. 4 is a perspective view of the carrier mounted with a similar one on a vehicle roof rack for supporting a canoe.

Figure 1:
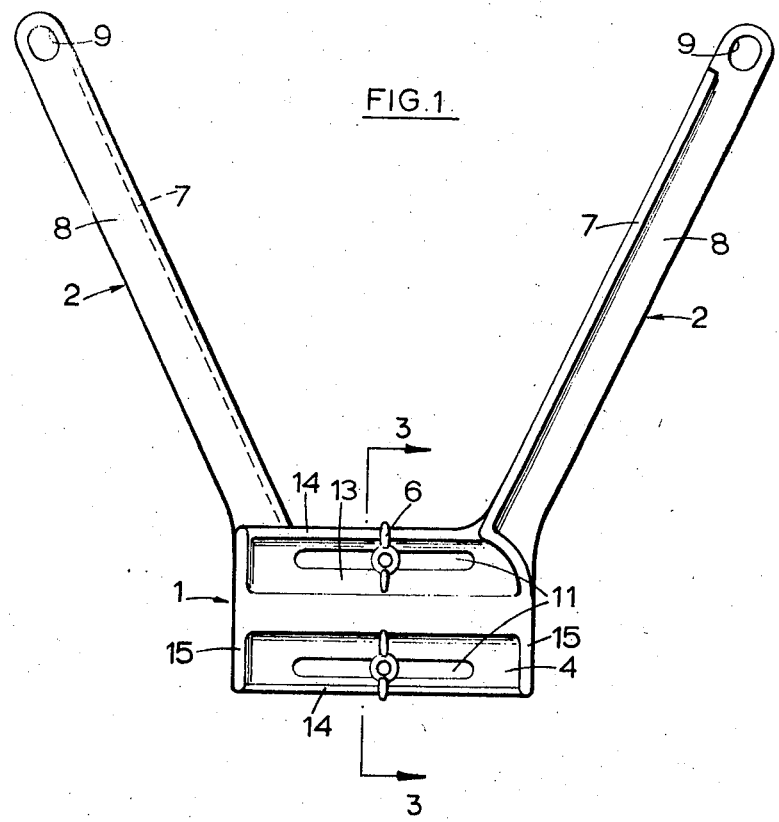
FIG. 1 is a front view of a carrier according to the invention.
Figure 2:
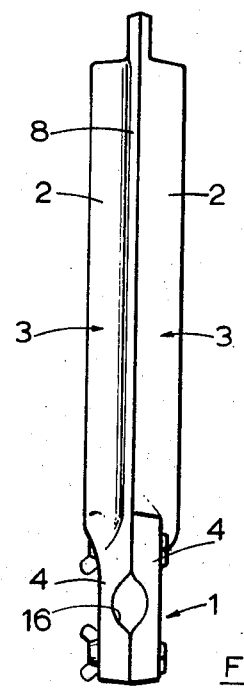
FIG. 2 is a side view of the carrier.

The carrier comprises a base 1 and a pair of limbs 2 which extend upwardly and divergently from the base 1. The carrier is constructed from two similar unitary components 3 made of metal, conveniently as lightweight castings of aluminium, coated with plastics material such as nylon, a nylon based material, or low density polythene. Each component 3 provides one of the limbs 2 and a base member 4 shaped to form one half of a clamp. The two components 3 are secured together at their base members 4 by clamping bolts 5 and wing nuts 6.

The limb 2 of each component 3 is straight and of angle-section and the base member 4 is of oblong rectangular, substantially plate like, form disposed on edge with its longer sides extending horizontally. The limb 2 extends upwards and outwards at an obtuse angle, conveniently of the order of 115°, from one end of the base member 4. It has an inner flange 7 at the inside of the obtuse angle which projects transversely with respect to the lengthwise direction of the base member, and an outer flange 8 which projects outwards in the lengthwise direction of the base member. There is a hole 9 in the upper end of the outer flange 8 to provide an anchorage for a retainer as will be described later in this specification. The base member 4 has a channel-shaped portion 10 extending centrally along its length, and two elongated, closed-ended, slots 11 at opposite sides of and extending parallel to the channel portion 10. Except for the channel portion, one face 12 of the base member at which the open-side of the channel is disposed is flat. Its opposite face 13, from which the channel portion 10 protrudes, has bead formations 14 extending continuously along its longer sides close to the slots 11, and deeper stiffening flanges 15 at its ends, the stiffening flange at that end of the base member from which the limb 2 extends merging into the inner flange 7 of the limb at the bottom of the latter. The stiffening flanges 15 and channel portions 10 project similar distances from face 13.

The two components 3 are assembled together with the flat faces 12 of their base members towards one another to form the complete base 1 of the carrier, and the limbs 2 at opposite ends of the base. The channel portions 10 form together a clamping socket 16 in the base. Through the slots 11 of the base members 4, which extend alongside one another, the shanks of the clamping bolts 5 are passed. Peripheral flats of the bolt heads, the heads in this instance being hexagonal but possibly being square, lie close to the flanks of the bead formations 14 of one of the base members and this restrains the bolts from turning with the wing nuts 6 when the nuts are turned.

In the assembled carrier the two limbs 2 define a generally V-shaped cradle for locating a canoe or other article to be supported by the carrier in use. The inner flanges 7 act as bearers for the article. As these flanges are presented broadside-on to the surfaces of the article which they engage, that is substantially parallel to the direction in which the longitudinal axis of the article to be supported extends, there is little risk of their causing damage to the article.

It will be readily understood that the elongated slots 11 enable the relative positions of the base members 4 of the two components to be varied in the lengthwise direction of the members to enable the spacing apart of the limbs to be adjusted.

In one practical example of the carrier the limbs 2 are 9½ inches long and the included angle between them is approximately 55°. At their widest spacing apart the upper ends of the inner flanges 7 of the limbs are 13½ inches apart and the lower ends are 6 inches apart, and at their narrowest spacing apart the upper ends of those flanges are 8½ inches apart and the lower ends are just 1 inch apart. The angle and dimensions stated are by way of example only; other angles and dimensions are of course possible.

In FIG. 4 of the drawings the carrier is shown fitted with another identical one to a luggage rack 17 of known form for supporting a canoe 18 on the roof of a vehicle 19 on which the luggage rack is mounted. The carriers are attached to front and rear cross members 20 of the rack. To apply each carrier to the relevant cross member 20, the components 3 are first disconnected from one another by releasing the wing nuts and bolts. The base members 4 are then fitted to opposite sides of the cross member so that the member is located in their channel portions 10, and the bolts and nuts re-connected to secure the components together again and clamp the re-assembled carrier to the cross member at the base 1. Before the nuts 6 are finally tightened the position of the carrier on the cross member can be adjusted as desired, and also the spacing of the limbs. The channel portions and the lengths of the bolts are such as to enable the base to be clamped to cross members of various cross-sectional sizes and shapes.

The canoe 18 is securely retained in the cradles of the carriers by means of elasticated strainers 21 which extend over the canoe and are anchored to the limbs of the carriers by end hooks 22 which engage in the holes 9 of the outer flanges 8 of the limbs.

I claim:

1. A carrier for use in supporting a canoe or other elongate article on a vehicle roof, comprising a base constructed and arranged for mounting the carrier on a vehicle roof rack, and a pair of elongated limbs which extend upwardly divergently from said base in laterally spaced relationship and in combination define a cradle for supporting the canoe or other article, said base comprising two similar base members each of which has one of said limbs integral therewith and is of rectangular, substantially plate-like, form with said one limb projecting obliquely from a side edge thereof and having a channel portion extending transversely relative to the longitudinal axis of said limb, said base members being disposed face-to-face with their channel portions oppositely disposed to define together an elongated clamping socket in said base which is able to receive a structural member of a vehicle roof rack, and said base members being relatively adjustable lengthwise of said clamping socket to vary the lateral spacing of said limbs and thereby the width of said cradle, and clamping means on said base members which releasably secure said base members together.

2. A carrier according to claim 1 wherein said base members have registering elongated slots extending parallel to and at opposite sides of said clamping socket, and said clamping means comprise bolts which extend through said slots and nuts fitted to said bolts.

3. A carrier according to claim 2 wherein said bolts have heads with peripheral flats, and said base members have projections near said slots with which said peripheral flats co-operate for restraining said bolts from turning when said nuts are turned.

4. A carrier according to claim 1 wherein said limbs are of angle-section, each said limb having a first flange of its angle-section presented towards the interior of said cradle and projecting substantially parallel to the direction in which the longitudinal axis of a canoe or other elongate article supported by the carrier when in use extends, and a second flange of its angle-section projecting outwards away from said cradle.

5. A carrier according to claim 1 wherein said limbs have anchorage apertures near their upper ends, and an elongated elasticated strainer extends between said limbs, has end hooks which releasably engage with said anchorage apertures, and is adapted to be passed over a canoe or other article which is supported in said cradle in use to secure the canoe or other article in said cradle.

6. A carrier according to claim 1 wherein each said base member, including said one limb integral with it, is a cast metal component coated with plastics material.

* * * * *